(12) United States Patent
Ohmuro et al.

(10) Patent No.: US 7,806,003 B2
(45) Date of Patent: Oct. 5, 2010

(54) DOPPLER TYPE ULTRASONIC FLOW METER

(75) Inventors: Yoshinori Ohmuro, Hamura (JP); Toshihiro Yamamoto, Imura (JP); Hironobu Yao, Hino (JP)

(73) Assignee: Fuji Electric Systems Co., Ltd.

( * ) Notice: Subject to any disclaimer, the term of this patent is extended or adjusted under 35 U.S.C. 154(b) by 988 days.

(21) Appl. No.: 10/598,397

(22) PCT Filed: Feb. 24, 2005

(86) PCT No.: PCT/JP2005/003007
§ 371 (c)(1),
(2), (4) Date: Sep. 22, 2006

(87) PCT Pub. No.: WO2005/083371
PCT Pub. Date: Sep. 9, 2005

(65) Prior Publication Data
US 2008/0139939 A1  Jun. 12, 2008

(30) Foreign Application Priority Data
Feb. 27, 2004  (JP)  .............................. 2004-052717

(51) Int. Cl.
*G01F 1/66* (2006.01)
(52) U.S. Cl. .................................................. 73/861.25
(58) Field of Classification Search ............... 73/861.25, 73/861.28, 861.18, 861.31
See application file for complete search history.

(56) References Cited

U.S. PATENT DOCUMENTS 4,295,378 A   10/1981   Erb et al.

(Continued)

FOREIGN PATENT DOCUMENTS

DE    19633558 A1    2/1998

(Continued)

OTHER PUBLICATIONS

Translation of the International Preliminary Report on Patentability for International Application No. PCT/JP2005/003007, with mailing date Sep. 28, 2006. (includes Written Opinion of the International Searching Authority).

(Continued)

*Primary Examiner*—Jewel Thompson
(74) *Attorney, Agent, or Firm*—Rossi, Kimms & McDowell LLP

(57) ABSTRACT

In a doppler type ultrasonic flow meter (1) for measuring the volumetric flow of a measurement object fluid (10) using doppler shift of ultrasound, a pair of ultrasonic transducers (3a, 3b) perform transmission of ultrasound and reception of an ultrasound echo resulting from the ultrasound being reflected. The ultrasonic transducers (3a, 3b) are disposed on an extension line of a measurement line ML for performing measurement of doppler shift, symmetrical about the center axis (5) of a pipe (2) with a measurement object fluid (10) flowing through its inside, and on the outside of the pipe (2). A flow profile for the side opposite, with respect to the center axis (5) of the pipe (2), the side on which the respective ultrasonic transducer (3a, 3b) is disposed is used for the calculation of the volumetric flow of the measurement object fluid (10).

3 Claims, 7 Drawing Sheets

U.S. PATENT DOCUMENTS

| | | | |
|---|---|---|---|
| 4,545,244 A * | 10/1985 | Yasuda et al. | 73/195 |
| 4,787,252 A | 11/1988 | Jacobson et al. | |
| 5,792,962 A | 8/1998 | Constant et al. | |
| 6,408,699 B1 | 6/2002 | Moss et al. | |
| 6,928,369 B2 * | 8/2005 | Kishimoto et al. | 702/45 |
| 6,931,945 B2 * | 8/2005 | Takeda et al. | 73/861.25 |
| 7,318,355 B2 * | 1/2008 | Ishikawa | 73/861.25 |
| 7,415,893 B2 * | 8/2008 | Takeda et al. | 73/861.18 |
| 7,509,878 B2 * | 3/2009 | Sato et al. | 73/861.25 |

FOREIGN PATENT DOCUMENTS

| | | |
|---|---|---|
| EP | 0138017 A1 | 4/1985 |
| JP | 10-038651 A | 2/1998 |
| JP | 10-281832 A | 10/1998 |
| JP | 2000-97742 A | 4/2000 |
| JP | 3401613 B2 | 2/2003 |
| JP | 2003-130699 A | 5/2003 |
| JP | 2004-12204 A | 1/2004 |

OTHER PUBLICATIONS

Supplementary search report issued in corresponding EP patent application No. 05719457.3-1234, dated Jun. 8, 2007.

Communication issued in corresponding EP patent application No. 05719457.3-1234, dated Oct. 30, 2007.

* cited by examiner

DOPPLER TYPE ULTRASONIC FLOW METER

TECHNICAL FIELD

This invention relates to a doppler type ultrasonic flow meter for measuring the volumetric flow of a measurement object fluid by utilizing doppler shift of ultrasound, and particularly to a doppler type ultrasonic flow meter capable of measuring even in cases where the flow of the measurement object fluid is asymmetrical.

BACKGROUND ART

As a flow meter with excellent responsiveness of when measuring the volumetric flow of a measurement object fluid, there is the doppler type ultrasonic flow meter. The principle by which a doppler type ultrasonic flow meter measures the volumetric flow of a measurement object fluid will be explained with reference to FIG. 1.

First, with an oscillator not shown in the drawings a predetermined frequency (basic frequency) $f_0$ is generated, and the frequency of this basic frequency $f_0$ is passed through an emitter (not shown). A pulse electrical signal of the generated basic frequency $f_0$ is inputted to a transmitter 121. As a result of the pulse electrical signal being applied, a pulse electrical signal of the basic frequency $f_0$ is outputted from the transmitter 121 to the inside of a pipe 102 with a measurement object fluid flowing through it. The pulse electrical signal is converted into an ultrasound pulse by an ultrasonic transducer 103, and radiated along a measurement line ML to inside the pipe 102.

The radiated ultrasound pulse is reflected by a tracer (reflector) such as air bubbles in the pipe 102. The reflected ultrasound echo is received by the ultrasonic transducer 103.

The received ultrasound echo is converted into an echo electrical signal by the ultrasonic transducer 103. The converted echo electrical signal is amplified by an amplifier not shown in FIG. 1, and converted into a digital echo signal by an A/D convertor 122. The digital echo signal is inputted to a flowrate calculating circuit 123.

In the flowrate calculating circuit 123, the electrical signal of basic frequency $f_0$ radiated into the pipe 102 from the transmitter 121 and the digital echo signal obtained from the reflected wave are compared. The frequency of the digital echo signal is shifted as a result of it passing through the measurement object fluid flowing at speed inside the pipe 102. And the flowrate of the measurement object fluid is calculated from the frequency difference between the two signals.

In a flow profile calculating circuit 124, a flow profile in a reflected wave measurement region on the measurement line ML is obtained. The obtained flow profile is corrected with the angle of incidence α of the ultrasound to obtain a flow profile in a cross-section perpendicular to the center axis of the pipe 102. The volumetric flow at a given time can be obtained by integrating the obtained flow profile over the cross-sectional area perpendicular to the center axis of the pipe 102.

In the vicinity of the wall of the pipe 102 on the side where the ultrasonic transducer 103 is disposed a flow profile is not obtained correctly. This is because the ultrasound emitted from the ultrasonic device in the ultrasonic transducer 103 is reflected by the end face of the ultrasonic transducer 103 and the inner wall face of the pipe 102 and becomes a large noise with respect to the proper ultrasound signal scattered from particles inside the pipe 102, and a doppler signal cannot be correctly obtained.

As a doppler type ultrasonic flow meter that solves this problem, a doppler type ultrasonic flow meter with which it is possible to display a flow profile under the premise that in relation to the axial-direction center of the pipe the flow on one side is symmetrical with the flow on the other side has been disclosed (for example patent Document 1). FIG. 2 is an example of this display. For the flowrate near the pipe wall of the pipe where noise is large because the ultrasonic transducer is disposed there, a flow profile is obtained under the premise that it is symmetrical about the axial-direction center of the pipe with the flowrate on the side where the noise is relatively small, and displayed on a monitor or the like.

As another doppler type ultrasonic flow meter that solves the above-mentioned problem, a doppler type ultrasonic flow meter which, for the flow profile on the side near the pipe wall where noise is large, extrapolates flow profile data of the pipe wall side where the noise is small has been disclosed (for example patent Document 2). FIG. 3 shows a flow profile and a corrected flow profile detected by a doppler type ultrasonic flow meter of patent Document 2. The flow profile (region Xn) where the noise is large showing the flow profile of FIG. 3 (A) is not used in the calculation of the volumetric flow. Its value is corrected by extrapolating (C) of the same figure. For the region where the noise is small (region Xm), (B) is assumed to be a flow profile with a normal value and is used unchanged in the calculation of the volumetric flow. By this method it is possible to compensate for the fall in measurement accuracy near the pipe wall on the side where the ultrasonic transducer is mounted.

Patent Document 1: JP-A-2004-12204
Patent Document 2: JP-A-10-281832

The prior art mentioned above can only be used in cases where it can be assumed that the flow profile is symmetrical on the side where the ultrasonic transducer is mounted and the opposite side. And, it cannot be applied in locations where the flow of the measurement object fluid curves or in locations where flows converge.

DISCLOSURE OF THE INVENTION

This invention is in providing a doppler type ultrasonic flow meter capable of measuring a volumetric flow correctly even at locations where the measurement object fluid curves and locations where flows converge.

The doppler type ultrasonic flow meter of the invention relates to a doppler type ultrasonic flow meter for measuring the volumetric flow of a measurement object fluid by using doppler shift of ultrasonic waves, and is characterized in that it has a pair of ultrasonic transducers for performing transmission of ultrasound and receiving of an ultrasound echo of reflected ultrasound, this pair of ultrasonic transducers are mounted on an extension line of a measurement line for performing measurement of doppler shift, symmetrically about the center axis of a pipe with a measurement object fluid flowing through its inside, and on the outside of the pipe, and a flow profile for the side opposite, with respect to the center axis of the pipe, the side on which the respective ultrasonic transducer is disposed is used for the calculation of the volumetric flow of the measurement object fluid.

When ultrasound from an ultrasonic transducer is radiated into the inside of a pipe, an ultrasound echo reflected by a tracer such as air bubbles inside the pipe is received by the ultrasonic transducer that radiated the ultrasound. In the frequency of the received ultrasound echo, in the vicinity of the ultrasonic transducer that radiated the ultrasound, noise caused by ultrasound reflected by the end face of the ultrasonic transducer and the pipe wall is large. Two ultrasonic transducers are mounted on an extension line of a measurement line symmetrically about the center axis of the pipe, and the region where noise is large of each is not used in the calculation of the flow profile.

To calculate the flow profile, of the two ultrasonic transducers a flow profile may be obtained for one and then a flow profile obtained for the other ultrasonic transducer. And ultrasound may be radiated into the pipe from the two ultrasonic transducers alternately and then a flow profile obtained for each of the two ultrasonic transducers.

With this invention, a flow profile is obtained for the side opposite to the side on which the ultrasonic transducer used for transmitting and receiving the ultrasound is mounted. The side where the noise caused by ultrasound reflected by the end face of the ultrasonic transducer and the pipe wall is large is not used in the calculation of the flow profile. And, two ultrasonic transducers are mounted symmetrically about the measurement line. Consequently, even in cases where the flow profile is not symmetrical about the center axis, such as when measuring the volumetric flow at a position where flows converge, more accurate volumetric flow measurement is made possible.

BEST MODES FOR CARRYING OUT THE INVENTION

In the following, preferred embodiments of the invention will be described in detail with reference to the drawings.

Embodiment 1

Figure 1:
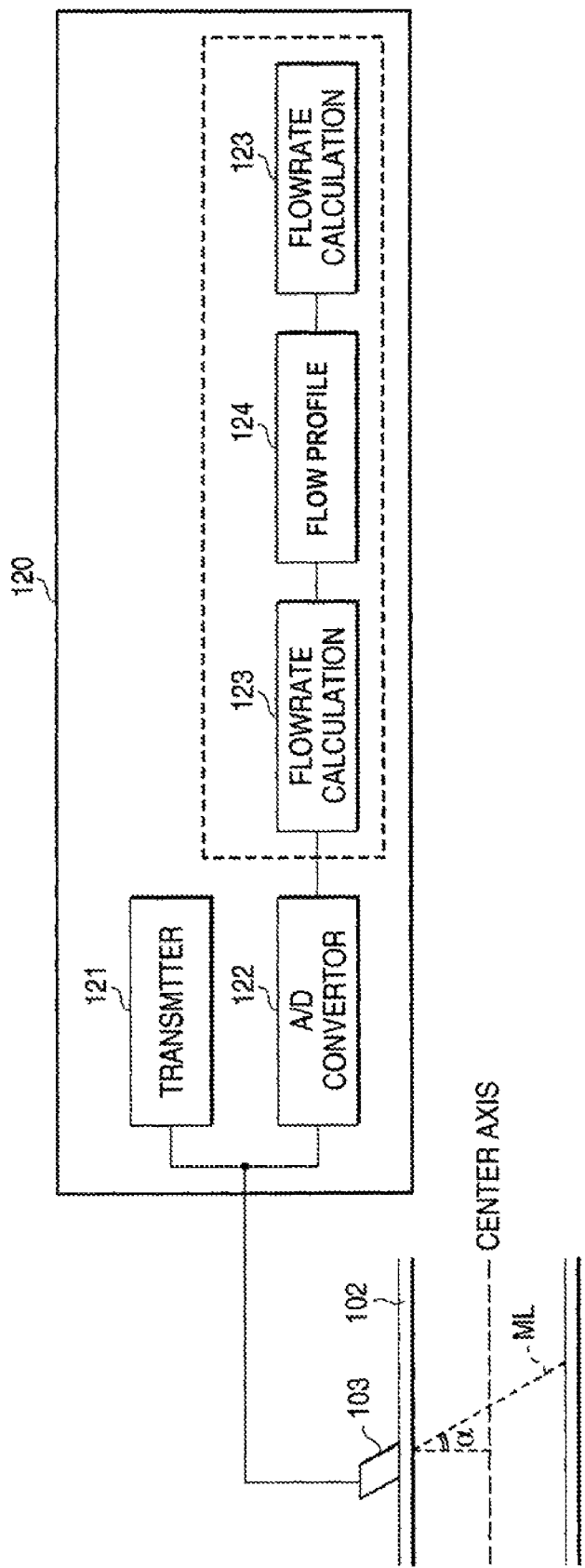
FIG. 1 is a system construction view of a doppler type ultrasonic flow meter of prior art.
Figure 2:
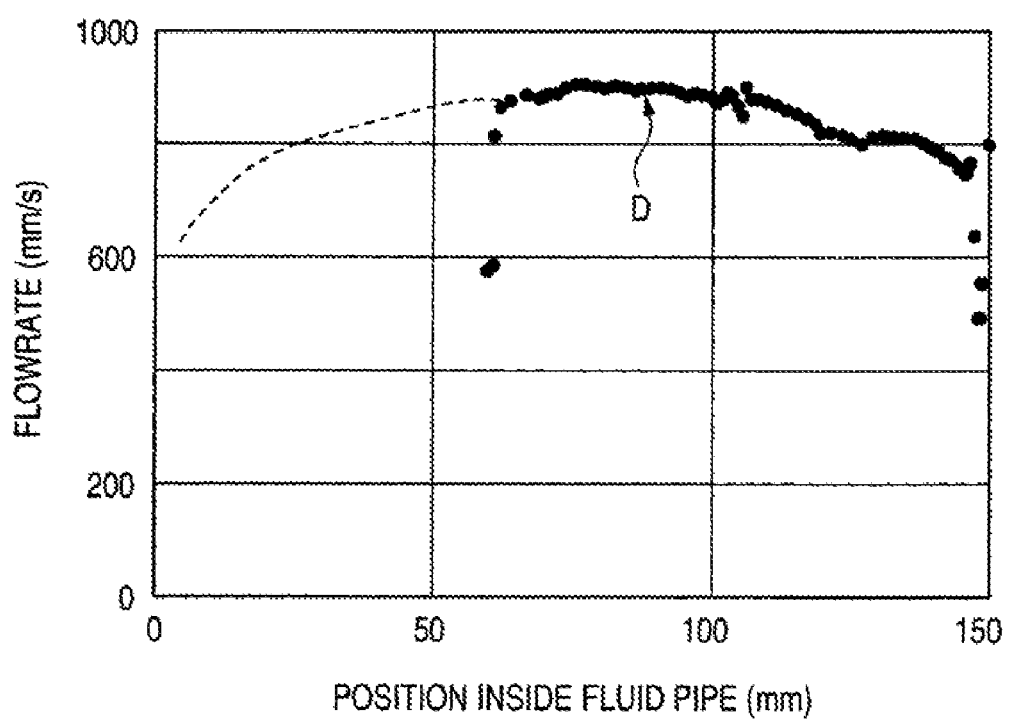
FIG. 2 is a display example of a flow profile from a doppler type ultrasonic flow meter of prior art.
Figure 3:
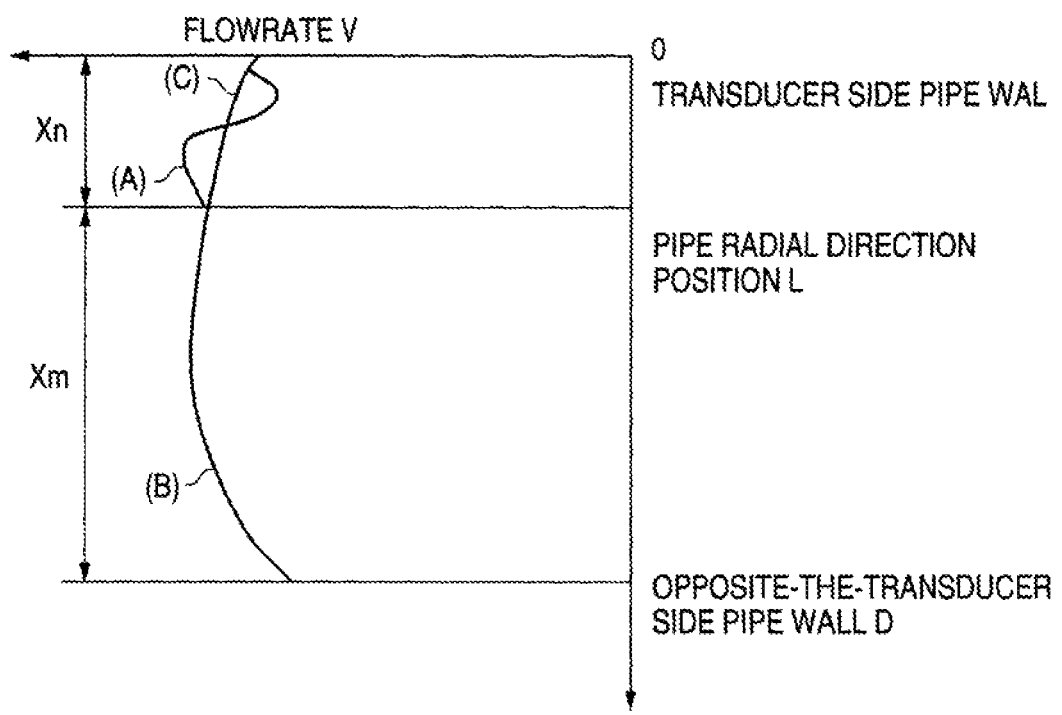
FIG. 3 is a view explaining correction of a flow profile by a doppler type ultrasonic flow meter of prior art.
Figure 4:
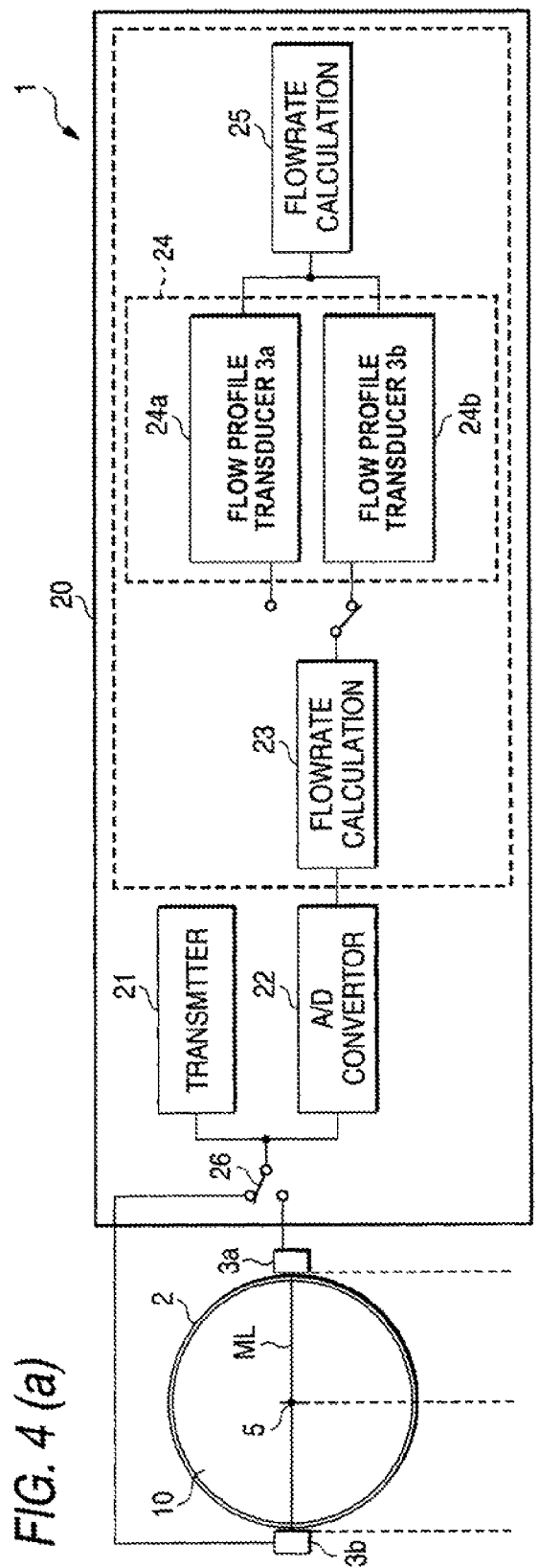
FIG. 4 is a system construction view of a doppler type ultrasonic flow meter according to an Embodiment 1.
Figure 4:
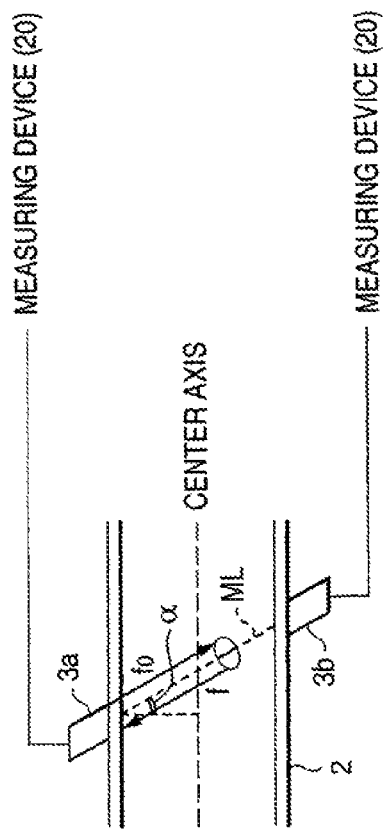

FIG. 4 is a system construction view of a doppler type ultrasonic flow meter according to an embodiment of the invention. This flow meter 1 is a device for measuring the volumetric flow of a measurement object fluid 10 flowing through the inside of a pipe 2, and takes a construction in which a measuring device 20 is connected to the pipe 2 by way of ultrasonic transducers 3a and 3b mounted on the outside of the pipe 2. The volumetric flow of a measurement object fluid such as a liquid flowing through the inside of the pipe 2 is obtained by ultrasound of a predetermined frequency being radiated from the outside of the pipe 2 at a predetermined angle and a doppler shift being obtained from a radi-ated wave echo, a flow profile shape inside the pipe being calculated from the doppler shift, and this flow profile shape being integrated.

The pipe 2 has a measurement object fluid 10 flowing inside it. The measuring device 20 is a device for measuring the volumetric flow of the measurement object fluid 10 flowing through the inside of the pipe 2, and in this embodiment includes a transmitter 21 for transmitting a pulse electrical signal; two ultrasonic transducers 3a and 3b for converting the pulse electrical signal transmitted from the transmitter 21 into an ultrasound pulse, radiating it into the pipe 2, receiving a reflected wave echo resulting from the ultrasound being reflected by a tracer inside the pipe 2, and converting the reflected wave echo into an echo electrical signal; a switch 26 switched to connect either one of the two ultrasonic transducers 3a, 3b to the measuring device 20; an A/D convertor 22 for converting the reflected wave echo detected by the two ultrasonic transducers 3a and 3b into a digital signal; a flowrate calculating circuit 23 for calculating a flow profile of the measurement object fluid 10 from the digital signal obtained; a flow profile calculating circuit 24 for calculating a flow profile on the basis of a signal detected by the ultrasonic transducer 3a or the ultrasonic transducer 3b from the flowrate data calculated by the flowrate calculating circuit 23; and a volumetric flow calculating circuit 25 for calculating the volumetric flow of the measurement object fluid 10 from the flow profile calculated from the ultrasonic transducer 3a and the ultrasonic transducer 3b. The ultrasonic transducer 3a is disposed upstream in the flow of the measurement object fluid 10 and the ultrasonic transducer 3b is disposed downstream. The two ultrasonic transducers 3a and 3b disposed in a pair are disposed symmetrically on the extension line of a measurement line ML.

The operation of a doppler type ultrasonic flow meter according to this embodiment, shown in FIG. 4, will now be explained with reference to the drawings as appropriate.

The transmitter 21 is made up of an oscillator for generating an electrical signal of a discretionary frequency and an emitter for outputting the electrical signal generated by the oscillator at predetermined time intervals (repeat frequency) in pulse form. The pulse electrical signal transmitted by the transmitter 21 is converted by the ultrasonic transducer 3a or 3b into ultrasound of a predetermined basic frequency (which will be written $f_0$). The converted ultrasound of the basic frequency $f_0$ is directed from the ultrasonic transducer 3a or 3b into the pipe 2 at a predetermined angle (which will be called the angle of incidence α). The radiated ultrasound travels straight along the measurement line ML inside the pipe 2.

Inside the pipe 2, the measurement object fluid 10 is flowing. The ultrasound of the basic frequency $f_0$ that had been traveling straight inside the pipe 2 is reflected by a tracer such as for example air bubbles included in the measurement object fluid 10. The reflected ultrasound echoes travel straight along the measurement line ML and are detected again by the respective ultrasonic transducer 3a or 3b.

The ultrasound echo received by the ultrasonic transducer 3a or the ultrasonic transducer 3b, after the signal is amplified by the amplifier, is converted into a digital signal in the A/D convertor 22. This digital echo signal is inputted to the flowrate calculating circuit 23.

In the flowrate calculating circuit 23, the electrical signal pertaining to the ultrasound of the basic frequency $f_0$ radiated into the pipe 2 from the transmitter 21 and the digital echo signal obtained from the reflected wave are compared. The frequency of the reflected wave is shifted as a result of it passing through the measurement object fluid 10 flowing at speed through the pipe 2. The flowrate of the measurement object fluid 10 is calculated from the frequency difference between the two signals.

In the flow profile calculating circuit 24, a flow profile in the measuring region of the reflected wave along the measurement line ML is obtained. The flow profile obtained is corrected with the angle of incidence α of the ultrasound to obtain a flow profile in a cross-section perpendicular to the center axis 5 of the pipe 2.

In the volumetric flow calculating circuit 25, the obtained flow profile is integrated over the cross-section perpendicular to the center axis 5 of the pipe 2. By this means, the volumetric flow of the measurement object fluid 10 at a given time can be obtained.

Figure 5:
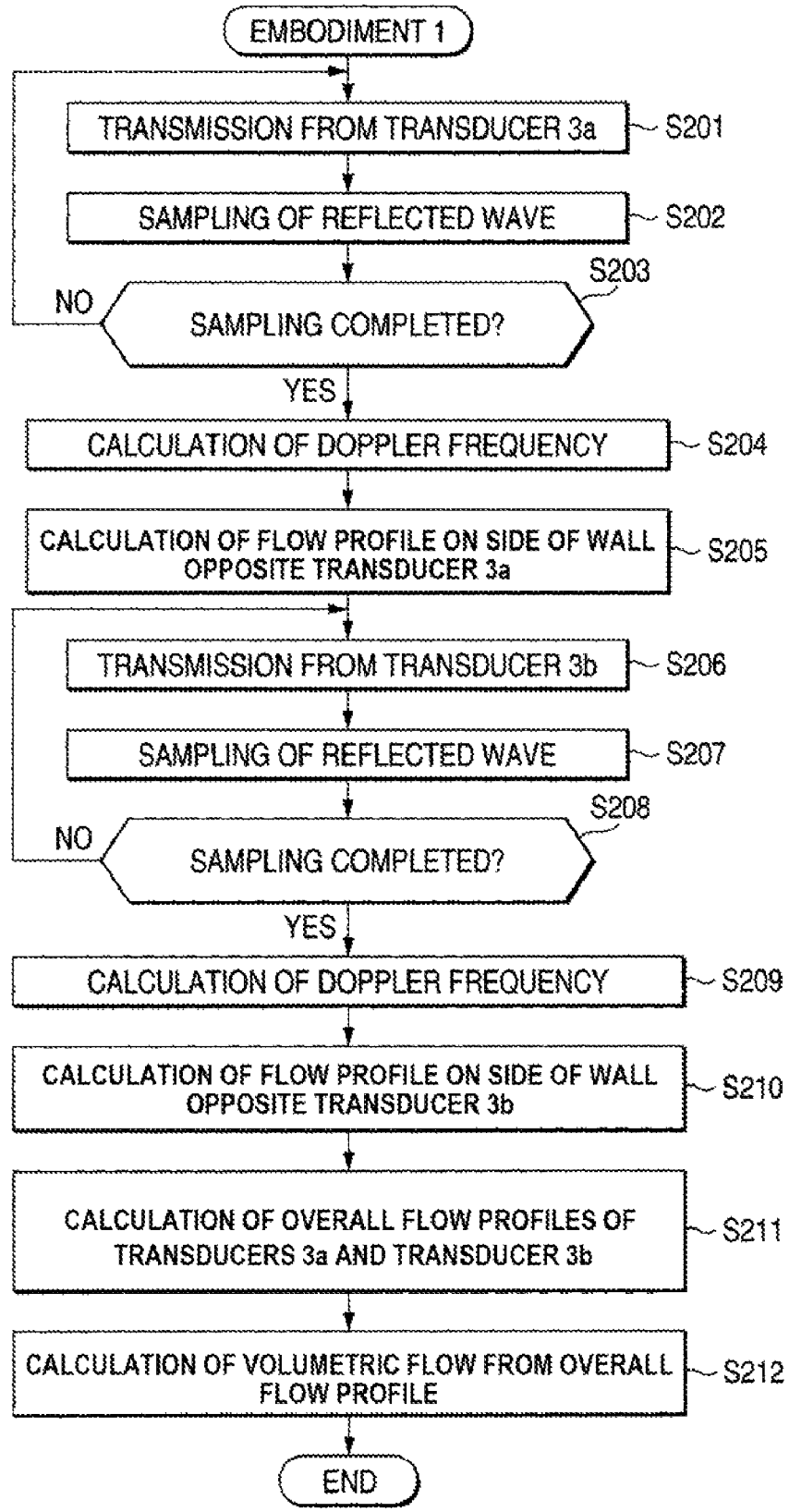
FIG. 5 is a flow chart of processing by which the doppler type ultrasonic flow meter of Embodiment 1 measures a volumetric flow.

FIG. 5 is a flow chart showing processing for measuring the volumetric flow of a measurement object fluid by the pulse doppler method. The chain of processing of the measurement object fluid volumetric flow measurement is realized by a CPU executing a program stored in a memory or the like not shown in the figure.

First, in the processing of step S201 through step S204, ultrasound of the basic frequency $f_0$ is radiated from the ultrasonic transducer 3a into the pipe 2 and reflected by the tracer multiple times, and a reflected wave frequency (which will be written f) is obtained.

In step S201, ultrasound of the basic frequency $f_0$ is radiated into the pipe 2 from the ultrasonic transducer 3a. In step S202 sampling is carried out and data for calculating the frequency f of the reflected wave is obtained. The sampling is carried out multiple times. In step S203, it is determined whether or not sampling has been carried out a predetermined number of times. When sampling has not been carried out the predetermined number of times (the case of No in step S203), processing returns to step S201. When sampling has been carried out the predetermined number of times (the case of Yes in step S203), processing proceeds to step S204.

Figure 6:
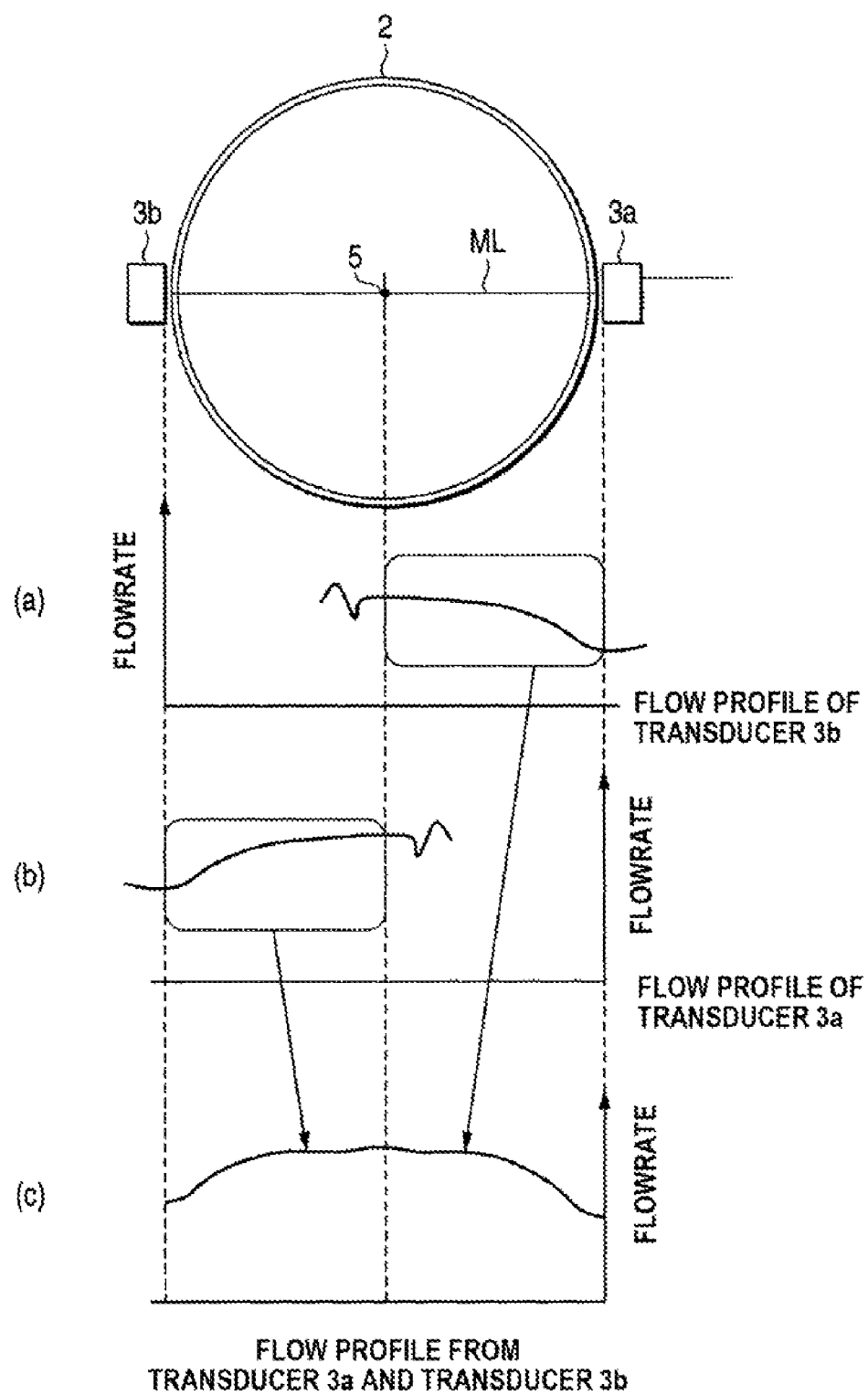
FIG. 6 is a view illustrating the calculation of an overall flow profile from flow profiles from two ultrasonic transducers.

In step S204, from the data obtained in step S201 through step S203, a doppler frequency which is the difference between the basic frequency $f_0$ of the radiated ultrasound and the frequency f of the reflected wave is calculated. In step S205, a flowrate conversion is carried out from the doppler frequency obtained in the processing of step S204, and a flow profile is obtained. The flowrate is calculated in the flowrate calculating circuit 23 of FIG. 4, and the flow profile is calculated by, of the flow profile calculating circuit 24 of FIG. 4, a circuit 24a pertaining to the ultrasonic transducer 3a. The flow profile is obtained for the opposite side of the center axis 5 of the pipe 2 from the side on which the ultrasonic transducer 3a is mounted. (a) of FIG. 6 is a graph showing the flow profile in the pipe 2 calculated on the basis of data from the ultrasonic transducer 3a.

For the ultrasonic transducer 3b also, in step S206 through step S210 the same processing is carried out, and a flowrate is obtained. The flowrate is calculated in the flowrate calculating circuit 23 of FIG. 4, and the flow profile is calculated by, of the flow profile calculating circuit 24 of FIG. 4, a circuit 24b pertaining to the ultrasonic transducer 3b. The flow profile obtained in step S210 is for the opposite side of the center axis 5 of the pipe 2 from the side on which the ultrasonic transducer 3b is mounted, that is, the remaining part which was not calculated using the ultrasonic transducer 3a in the previous steps S201 through S205. (b) of FIG. 6 is a graph showing the flow profile in the pipe 2 calculated on the basis of data from the ultrasonic transducer 3b.

When the data of the flow profile for the pipe wall side opposite the ultrasonic transducer 3a across the center axis 5 of the pipe 2 obtained in step S205 and the flow profile for the pipe wall side opposite the ultrasonic transducer 3b across the center axis 5 of the pipe 2 obtained in step S210 are taken together, a flow profile of a whole cross-section perpendicular to the center axis 5 of the pipe 2 is obtained (step S211). (c) of FIG. 6 is a graph showing a flow profile obtained by the processing of step S211.

From the flow profile obtained in step S211, integrating for the whole cross-section perpendicular to the center axis 5 of the pipe 2, a volumetric flow of the measurement object fluid is obtained (step S212).

On an extension line of a measurement line, two ultrasonic transducers are disposed so as to be symmetrical about a center axis of a pipe. With each of the ultrasonic transducers, a flow profile is calculated for only the opposite side of the center axis of the pipe to the side on which the ultrasonic transducer is mounted. The flow profile of the side near the ultrasonic transducer, where noise is large, is not used for obtaining the flow profile as a whole. By this means, measurement of a more exact flow profile, and hence volumetric flow, is made possible, even when the flow of the measurement object fluid is not symmetrical about the center axis of the pipe.

Embodiment 2

This embodiment relates to an example of a flow profile calculating method different from the method of Embodiment 1. In the following, explanations of points common with Embodiment 1 will be omitted, and only points having difference will be explained.

A system construction view of a doppler type ultrasonic flow meter 1 according to this embodiment is the same as Embodiment 1 and so here a description of the construction will be omitted. With reference to FIG. 4, the principle by which a doppler type ultrasonic flow meter according to this embodiment measures volumetric flow will be explained.

The pulse electrical signal transmitted by the transmitter 21 is converted into ultrasound of a basic frequency $f_0$ by the ultrasonic transducer 3a or 3b. First, the ultrasound of the basic frequency $f_0$ converted by the one ultrasonic transducer 3a is radiated from the ultrasonic transducer 3a into the pipe 2 through which the measurement object fluid 10 is flowing. The radiated ultrasound travels along the measurement line ML and is reflected by a tracer such as air bubbles. The reflected ultrasound echo travels along the measurement line ML and is received by the ultrasonic transducer 3a. Next, ultrasound of the basic frequency $f_0$ converted by the ultrasonic transducer 3b is radiated from the ultrasonic transducer 3b into the pipe 2 through which the measurement object fluid 10 is flowing. The radiated ultrasound travels along the measurement line ML and is reflected by the tracer. The reflected ultrasound echo travels along the measurement line ML and is received by the ultrasonic transducer 3b.

After ultrasound is radiated into the pipe 2 from the two ultrasonic transducers 3a and 3b alternately, and sampling is carried out, for each a flow profile of the opposite side of the center axis of the pipe 2 is obtained. From the flow profile, the sought volumetric flow of the measurement object fluid 10 is obtained.

Figure 7:
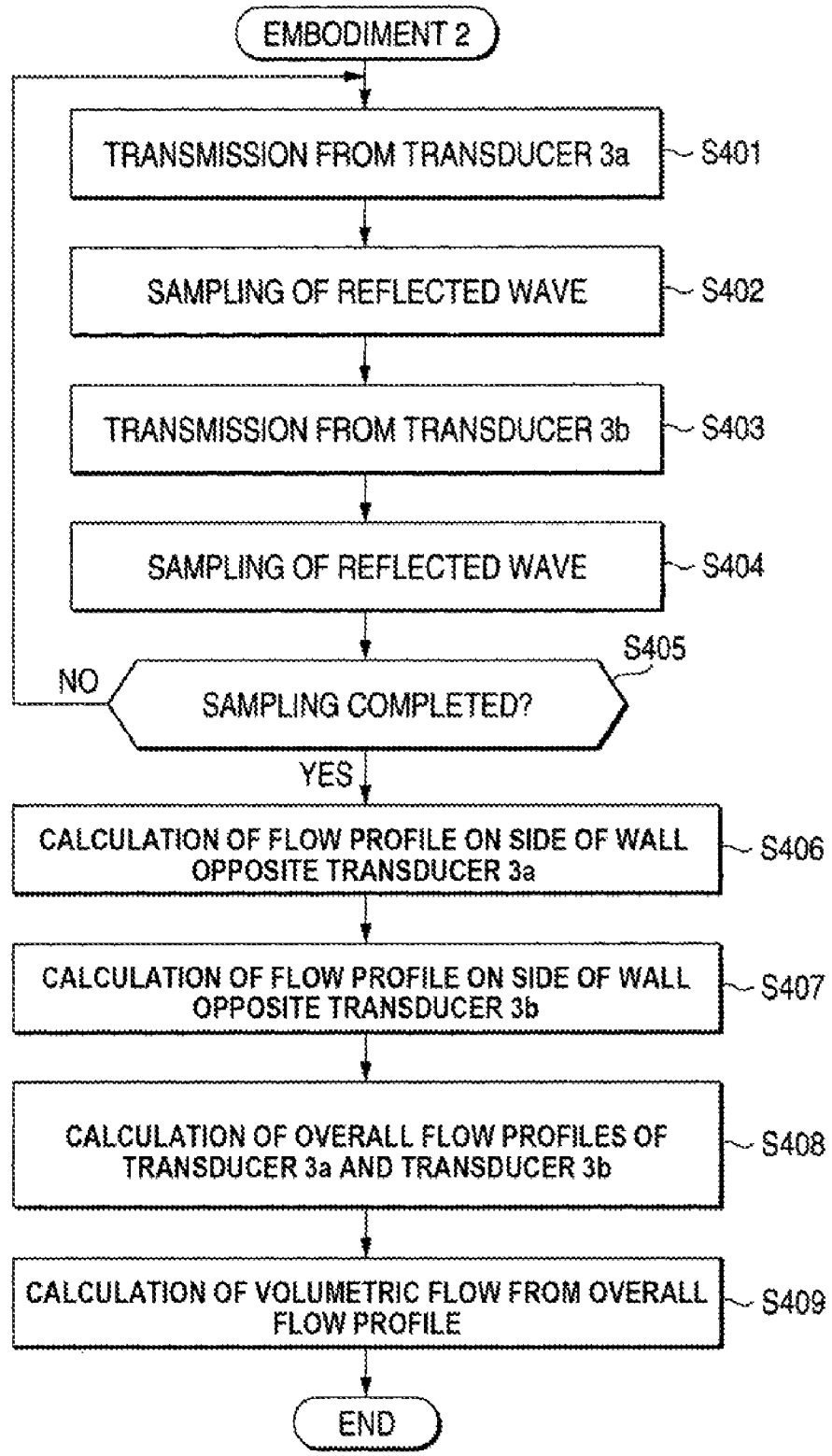
FIG. 7 is a flow chart showing processing by which a doppler type ultrasonic flow meter of an Embodiment 2 measures a volumetric flow.

FIG. 7 is a flow chart of the processing by which a doppler type ultrasonic flow meter according to this embodiment measures volumetric flow. The chain of processing of the measurement object fluid flowrate measurement is realized by a CPU executing a program stored in a memory or the like not shown in the figure.

First, in processing of step S401 through S405, ultrasound is transmitted from the two ultrasonic transducers alternately. The ultrasound is reflected by the tracer included in the fluid, and a reflected ultrasound echo is received by the ultrasonic transducer that transmitted the ultrasound. The alternating transmissions of ultrasound from the two ultrasonic transducers are carried out repeatedly a predetermined number of times.

In step S401, ultrasound of a predetermined frequency (which will be written $f_0$) is radiated from the ultrasonic transducer 3a positioned on the upstream side in the flow of the measurement object fluid. In step S402, the ultrasound is reflected by the tracer and an ultrasound echo is received by the ultrasonic transducer 3a. In step S403 and step S404, similarly for the ultrasonic transducer 3b also, ultrasound of the predetermined frequency $f_0$ is radiated and an ultrasound echo reflected by the tracer is received by the ultrasonic transducer 3b.

In step S405, it is determined whether or not sampling has been carried out a predetermined number of times. When it has not been carried out the predetermined number of times (the case of No in step S405), processing returns to S401. When it has been measured the predetermined number of times (the case of Yes in step S405), processing proceeds to step S406.

In step S406, from the data obtained by step S401 through step S405, the flow profile on the opposite side of the center axis 5 of the pipe from the ultrasonic transducer 3a is calculated. Similarly, in step S407, from the wave received at the ultrasonic transducer 3b, a flow profile of the measurement object fluid 10 on the opposite side of the center axis 5 from the side on which the ultrasonic transducer 3b is disposed is obtained. Incidentally, in relation to step S406 and step S407, the order of the processing is not limited to the procedure of FIG. 7. Alternatively the processing of step S407 may be carried out first and then the processing of step S406 carried out afterward.

In step S408, from the flow profiles of the measurement object fluid 10 on the respective opposite sides of the center axis 5 from the sides on which the ultrasonic transducers 3a, 3b are disposed obtained from step S406 and step S407, a flow profile of the whole pipe 2 is calculated. And by integrating the flow profile of the pipe 2 as a whole over an entire cross-section perpendicular to the center axis 5 of the pipe 2, the volumetric flow of the measurement object fluid 10 is obtained (step S409).

Because a doppler type ultrasonic flow meter according to this embodiment has the same system construction as that of Embodiment 1, in relation to the measuring method of the volumetric flow of the measurement object fluid, for example means for selecting by which, of the method of this embodiment and the method of Embodiment 1, measurement is carried out may be provided.

Besides this, the invention can be worked with various further changes, without being limited by the above examples.

The invention claimed is:

1. A doppler type ultrasonic flow meter for measuring volumetric flow of a measurement object fluid using doppler shift of ultrasound, comprising:
   a pair of ultrasonic transducers for transmitting ultrasound and receiving of an ultrasound echo of reflected ultrasound, the pair of ultrasonic transducers being disposed on the outside of a pipe having the measurement object fluid flowing therethrough, and being disposed symmetrically on an extension line of a measurement line for performing measurement of doppler shift; and
   calculating circuitry for calculating at least (a) a first flow profile based upon an ultrasound echo received when a first of the pair of ultrasonic transducers is transmitting ultrasound, and (b) the volumetric flow of the measurement fluid based upon the first flow profile,
   wherein the first flow profile is for the side opposite, with respect to the center axis of the pipe, the side on which the first of the pair of ultrasonic transducers is disposed.

2. A doppler type ultrasonic flow meter according to claim 1, wherein after ultrasound from the first of the pair of ultrasonic transducers is radiated into the pipe and a flow profile for the opposite side with respect to the center axis of the pipe from the side on which the first of the pair of ultrasonic transducers is disposed is calculated, ultrasound is radiated into the pipe from the second of the pair of ultrasonic transducers, and a second flow profile for the opposite side from the side on which the second of the pair of ultrasonic transducers is disposed is calculated by the calculating circuitry.

3. A doppler type ultrasonic flow meter according to claim 1, wherein after ultrasound is radiated into the pipe alternately from the first of the pair of ultrasonic transducers and from the second of the pair of ultrasonic transducers, with respect to the center axis of the pipe, flow profiles are respectively calculated for the opposite sides from the sides on which the first of the pair of ultrasonic transducers and the second of the pair of ultrasonic transducers are disposed.

* * * * *